April 18, 1933. O. G. SIMMONS 1,904,956
METHOD OF CUTTING THE TEETH OF GEARS
Filed March 27, 1930 7 Sheets-Sheet 1

INVENTOR

April 18, 1933. O. G. SIMMONS 1,904,956
METHOD OF CUTTING THE TEETH OF GEARS
Filed March 27, 1930 7 Sheets-Sheet 5

INVENTOR

April 18, 1933.  O. G. SIMMONS  1,904,956
METHOD OF CUTTING THE TEETH OF GEARS
Filed March 27, 1930  7 Sheets-Sheet 7

INVENTOR

Patented Apr. 18, 1933

1,904,956

UNITED STATES PATENT OFFICE

OLIVER G. SIMMONS, OF LAKEWOOD, OHIO

METHOD OF CUTTING THE TEETH OF GEARS

Application filed March 27, 1930. Serial No. 439,319.

This invention relates to a method of cutting the teeth of gears and is a companion application for Letters Patent to my application filed March 24, 1927, Serial No. 178,021, for method of cutting gear teeth, issued June 24, 1930 as Patent No. 1,765,385 and reissued March 31, 1931 as Reissue Patent No. 18,021, and my application filed November 21, 1927, Serial No. 234,788, for method of generating gears, issued June 23, 1931 as Patent No. 1,811,568, and my application filed November 20, 1929, Serial 408,526, for method of cutting the teeth of gears, issued June 7, 1932, as Patent No. 1,862,202.

The present invention embodies a method of generating the teeth in spur and helical gears utilizing a cutter commercially known as a spiral gear shaped cutter; that is to say, a cutter with twisted teeth, and is similar to my above mentioned application, Serial No. 234,788, with the exception that in this method the tangential movement of the cutter substantially transversely across the face of the work is along a curvilinear line.

The present invention has for an object to provide a method of generating with an involute helical gear shaped cutter spur gears with straight teeth provided with involute curves in a plane of revolution, and further to generate involute curved tooth faces, such that all gears cut by the same cutter or any other helical gear shaped cutter conjugate to the same rack will mesh properly with each other.

A further object of the invention is to provide a method of generating helical or straight tooth gears with a twisted tooth or a helical gear shaped cutter.

A further object of the invention is to provide a method of generating helical or straight tooth gears with a twisted tooth or a helical gear shaped cutter by which the cutter has true generating action on the curves of the tooth faces being generated during a curvilinear tangential movement of the cutter across the face of the gear. The cutter and gear meanwhile rotating as they would if in intermeshing engagement with an intermeshing curvilinear rack.

A still further object of the invention is to provide a method such that any helical cutter of a given normal pitch may be utilized to generate the teeth in either a spur or a helical gear having a corresponding pitch in the case of spur gears and a corresponding normal pitch in the case of helical gears, by which method, as will be hereinafter described in detail, the given cutter has great versatility, in that it is not restricted for use in cutting a given gear but may be used to cut a gear of a given pitch to any angle of helix.

With the above and other objects in view the invention comprises the method herein disclosed and illustrated in the accompanying drawings hereinafter described and particularly set forth in the appended claims, together with such variation and modification thereof as will be apparent to those skilled in the art to which the invention appertains. The drawings accompanying this application are for the purpose of illustration only.

Referring to the drawings, Fig. 1 is a diagrammatic view illustrating the method as applied to the cutting of the straight teeth of a spur gear showing the position of the cutter in dotted lines at the beginning of the cutting operation in mesh with an imaginary curvilinear rack shown by dot and dash line, said imaginary curvilinear rack also meshing with the finished spur gear, and also showing the position of the cutter in mesh with said imaginary curvilinear rack after it has completed the cutting of the teeth of the spur gear referred to.

Figure 1:
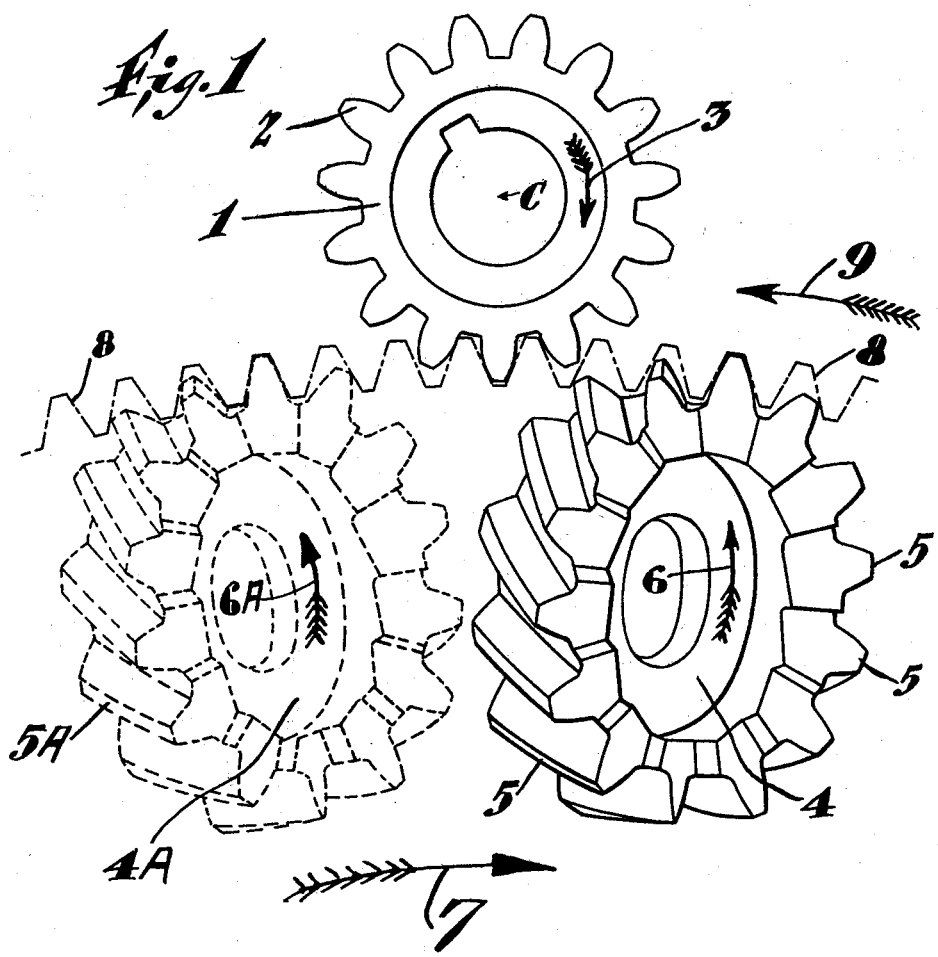
Figure 5:
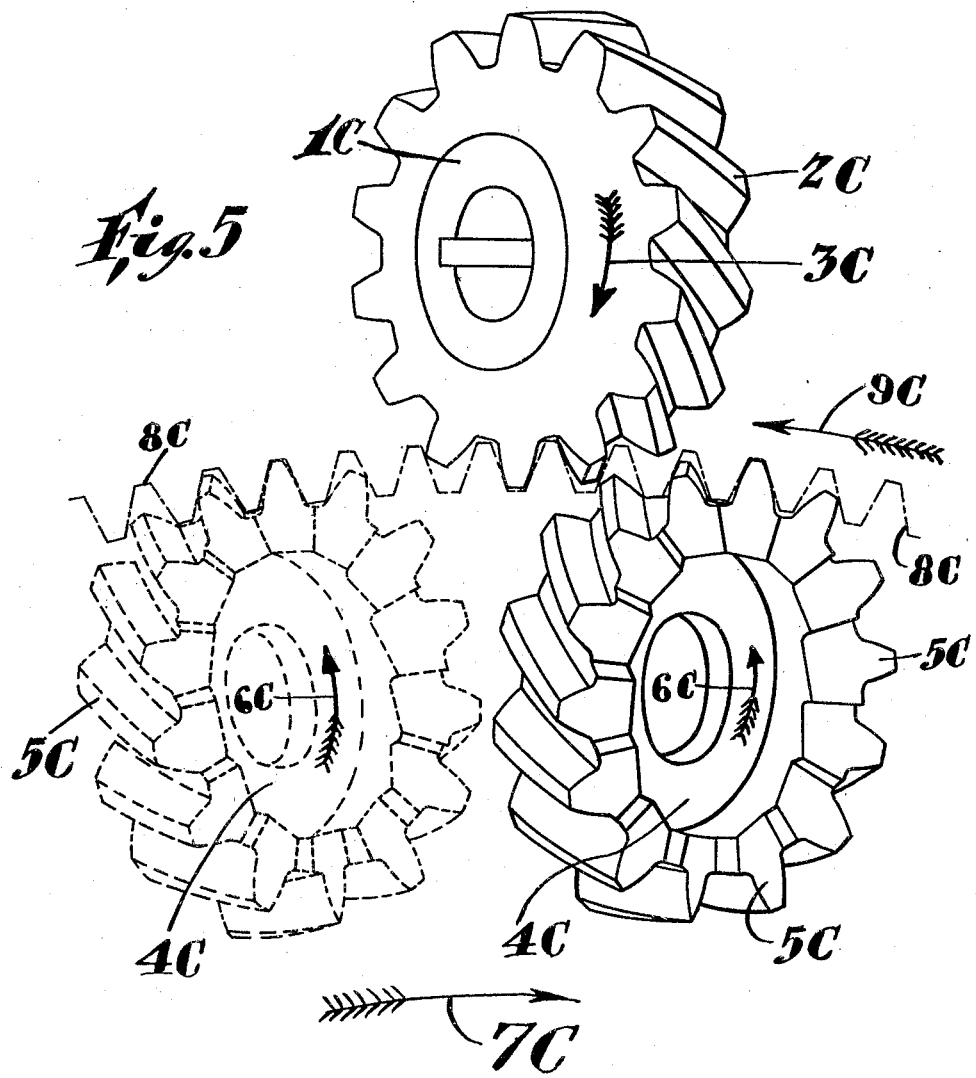

Fig. 5 is a view similar to Fig. 1, except that it illustrates the method as applied to the cutting of helical gears, using the same helical gear shaped cutter and showing the position of the cutter in dotted lines at the beginning of the cutting operation in mesh with the imaginary curvilinear rack shown by dot and dash line, said imaginary curvilinear rack also meshing with the finished helical gear, and showing also the position of the cutter in mesh with said imaginary curvilinear rack after it has completed the cutting of the teeth of the helical gear referred to.

Figure 6:
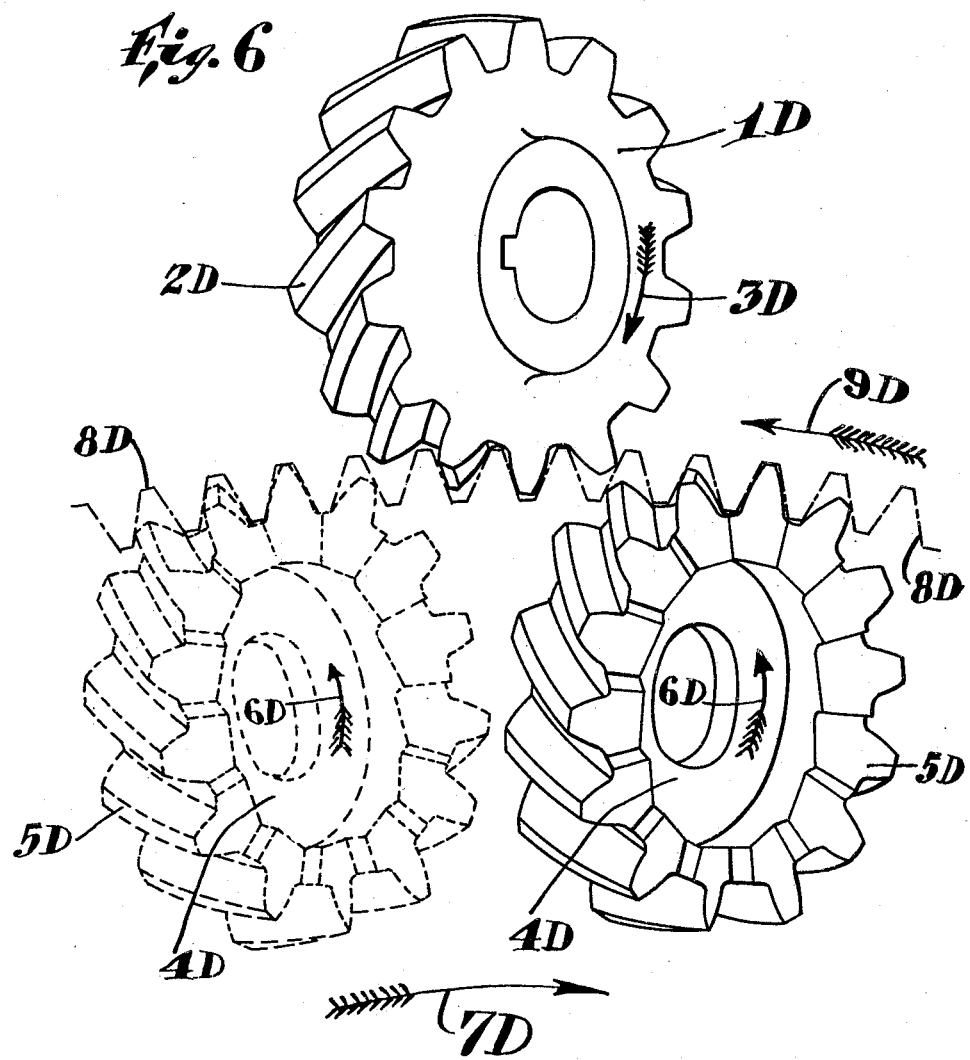

Fig. 6 is a view similar to Fig. 5, except in this drawing a right hand helical gear shaped cutter is used to generate the twisted teeth of the left hand gear illustrated having a helix angle corresponding to the helix angle of the cutter.

Figure 7:
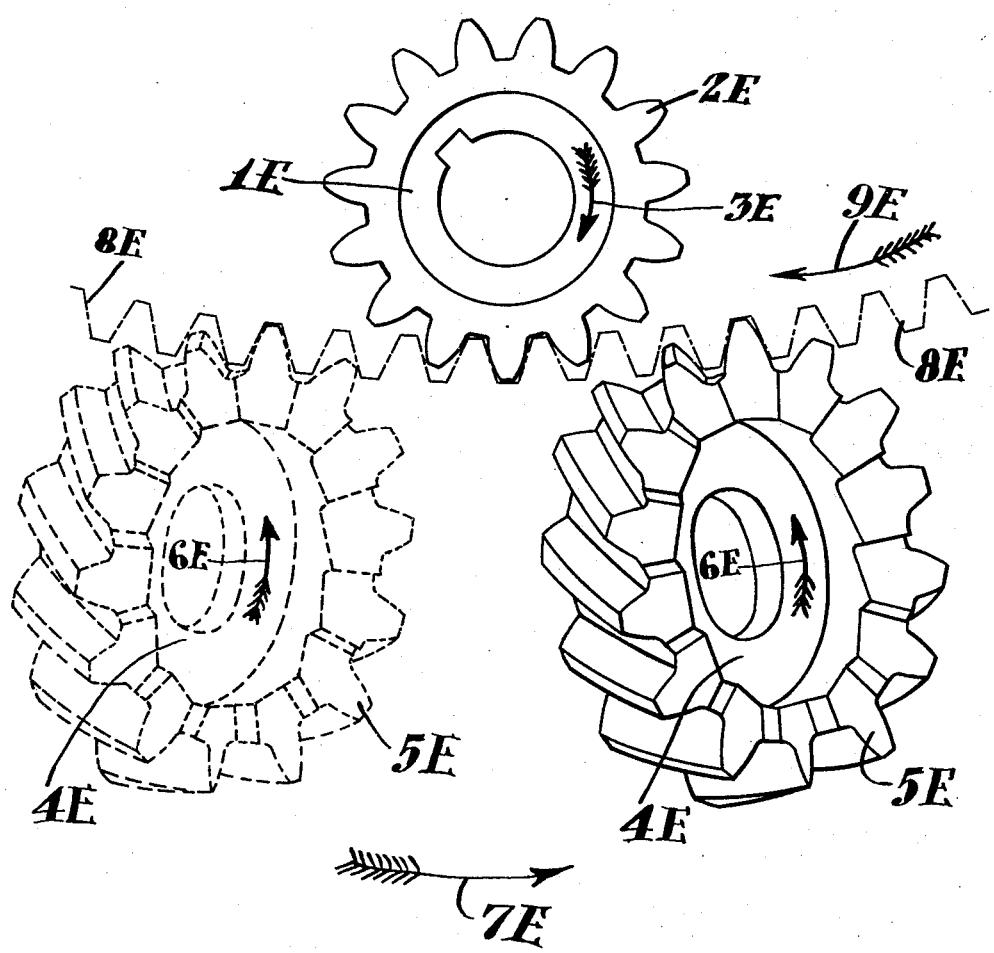

Fig. 7 is a view similar to Fig. 1 except that in this view the curvilinear rack is reversed from the order shown in Fig. 1.

The apparatus for practicing my invention utilizes a twisted tooth or a helical gear shaped cutter in which the teeth are twisted to a given angle of helix, the normal pitch being the determining factor as to its utilization for generating the teeth of gears.

The commercially known spiral cutter, therefore, of a given normal pitch may be used to cut the teeth of any helical or spur gear of the given pitch. The normal pitch of the cutter is, therefore, the determining factor in the practice of this invention in the utilization of a given pitch cutter and not the helical angle of the cutter.

My present invention resides in the movements of a commercially known spiral cutter continuously rotating in one direction and reciprocating across the face of the gear blank or work; one stroke of which reciprocating movement is in effect a cutting stroke in cutting contact with the work, while the other stroke is non-effective, that is, non-cutting, it being a return of the cutter to the original position. This reciprocation of the cutter is maintained at a relatively rapid rate of speed. At the beginning of the return stroke the cutter is preferably given an additional movement to withdraw it from contact with the gear blank. At the end of the return stroke and at the beginning of the effective cutting stroke, the cutter is again moved into position to effect cutting contact during the cutting stroke.

Simultaneously with the rotary and reciprocating movements, previously referred to, the cutter or gear blank is moved along a common curvilinear line tangent to the pitch circles of the cutter and blank to cause one or the other to pass transversely across the face of the cutter or gear blank depending upon which has been given the curvilinear movement referred to, which movement results in the cutter and gear blank approaching each other. This curvilinear movement is continued in the same direction to move said cutter and blank apart, the work meanwhile rotating on an axis disposed to the axis of the cutter corresponding to the helical angle of the teeth of the cutter to produce straight teeth in the gear blank in one aspect of my invention and in another aspect of my invention the axis of the cutter will be disposed to the axis of the gear blank corresponding to the sum of the measure of the combined helix angles of the cutter and the helical gear blank to produce twisted teeth of the same hand as the cutter and in another aspect of my invention, the axes of the cutter and gear blank will be disposed to the same helix angle to produce a helical gear of opposite hand to that of the cutter. The teeth produced in the gears in all cases are conjugate to the imaginary curvilinear rack conjugate to the cutter.

From the foregoing it is understood in the practice of my method that the straight teeth of a spur gear will result if the axes of the work spindle and cutter spindle are adjusted and secured in angular position, one with the other, corresponding to the helix angle of the helicoid teeth of the cutter and that the twisted teeth of the helical or spiral gear of the same nature as the cutter will result if the aforesaid axes are adjusted and secured at the combined angle of the cutter and gear, and that a helical gear of an opposite hand to that of the twisted teeth of the cutter will result if the axes are adjusted to a position so that the plane of each will be parallel to the other.

In my present method, therefore, forming the subject matter of this specification, the straight teeth in a spur gear or the helical teeth in a spiral or twisted tooth gear will be produced dependent upon the adjustment of the axes of the work and cutter. The curvilinear movement of the imaginary rack intermeshing with the teeth of the work and the teeth of the cutter, resulting in rotary movements of each as heretofore described and as will be more particularly set forth hereinafter.

From the foregoing it is further understood that in the practice of my present method a given helical cutter is adaptable for use in generating the teeth of any spur or helical gear and in the case of the latter, right or left hand helicoid teeth may be generated in the work with the same cutter, it being merely a matter of adjustment of the axes of the cutter and work and the correlation of the curvilinear and rotary movements.

The curvilinear movement of the imaginary rack is relatively slow with respect to the reciprocating movement of the cutter across the face of the work and it will be understood that since the teeth of the curvilinear imaginary rack intermesh with the teeth of the work and the cutter, the rotary movements of the cutter and work will be correlated with respect to each other and the rack, and will therefore be relatively slower than the reciprocating movement of the cutter across the face of the work.

It is also of importance to know that the curvilinear movement of the cutter across the face of the work is relatively slower than the speed of the reciprocatory rotary movement of the cutter.

Referring to Fig. 1, the spur gear 1 is provided with the straight tooth 2 and is adapted to rotate slowly on its axis C in the direction of the arrow 3. The teeth 2 of the gear 1 are shown in the drawings as having been cut completely by means of the helical or twisted tooth gear shaped cutter 4, which is provided with the teeth 5.

The cutter 4 is adapted to be secured to the cutter spindle of suitable apparatus or machine and to be continuously rotated in the direction of the arrow 6 and simultaneously moved slowly in the direction indicated by the arrow 7 along a curvilinear line parallel to the curvilinear line of movement of the continuously moving imaginary curvilinear rack 8, said imaginary curvilinear rack moving continuously in the curvilinear direction indicated by the arrow 9.

The cutter 4 is known commercially as a spiral gear shaper cutter.

The position of the cutter 4 as shown in the drawings, Fig. 1, is substantially the position of the cutter after it has completed the cutting of the teeth 2 of the gear 1.

Figure 2:
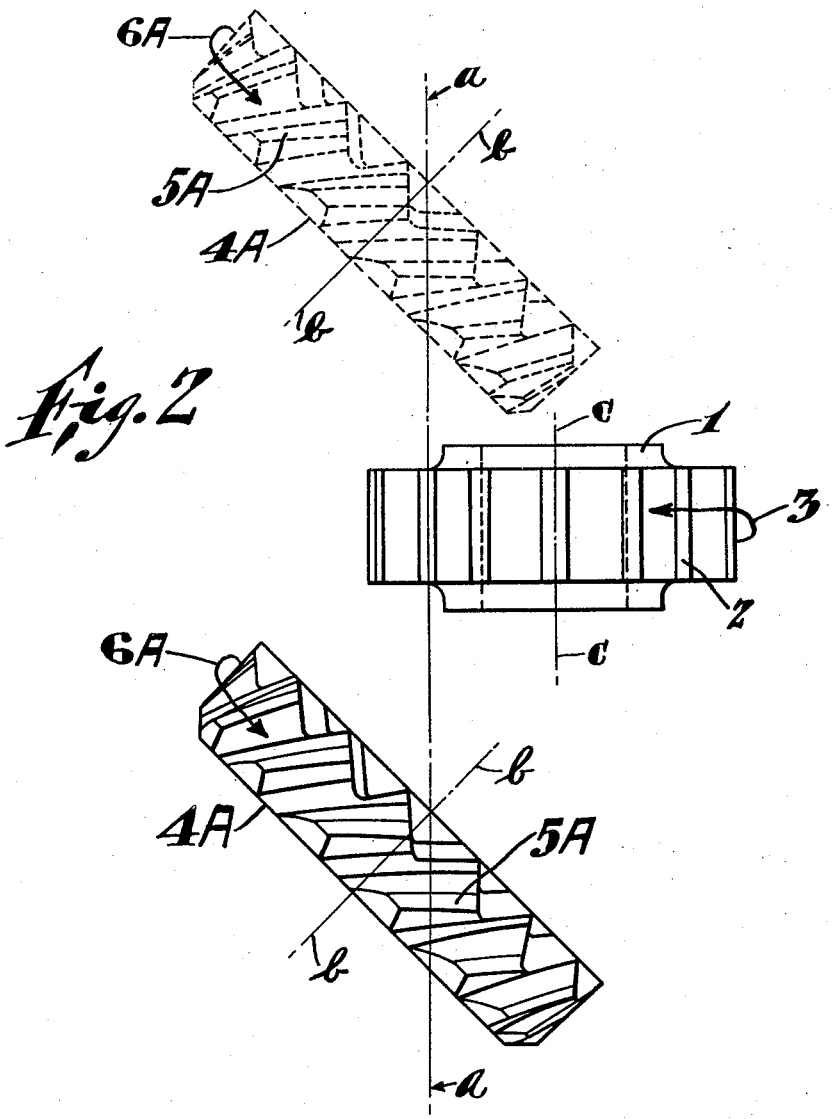
Fig. 2 is a plan view looking from the bottom of Fig. 1 showing in full lines the position of the gear blank and the helical gear shaped cutter at the beginning of the cutting operation, the cutter being shown in dotted lines at the end of its first cutting stroke.

In this method the first position of the cutter 4, before cutting the teeth 2 of the gear 1, is indicated by the same reference numerals with the capital letter A affixed. The cutter in this position is shown by dotted lines and is assumed to be reciprocating toward and away from the observer along a line perpendicular to the plane of the sheet of drawings, Fig. 1, which is along line $a$—$a$ shown in Fig. 2 a required measure of distance to clear the gear 1, as illustrated in Fig. 2.

The gear shaper cutter 4A is also rotating in the direction of the arrow 6A and moving in the direction indicated by the arrow 7.

The rotary movement 3 of the gear 1 and the rotary movement 6A of the gear shaper cutter 4A is of such velocity as would be obtained if the gear 1 and the cutter 4A were meshing as shown with the imaginary curvilinear rack 8, while the curvilinear rack 8 is continuously moving in the direction indicated by the numeral 9; meanwhile the cutter 4A rotating continuously in the direction of the arrow 6A also slowly moves along a curvilinear line in the direction of the arrow 7, from the position of the cutter 4A to the position of the cutter indicated by the numeral 4.

From the foregoing movements it will be observed that the movements of gear 1 and cutter 4 with intermeshing curvilinear rack 8 are continuous. The imaginary continuously moving curvilinear rack, therefore, is of infinite length and its movement in the direction of the arrow 9 is continuous.

In the aforesaid rotary movements of the cutter and work the axis $b$—$b$ of the cutter 4, see Fig. 2, is disposed angularly with respect to the axis $c$—$c$ of the work 1 to effect alignment between the teeth of the cutter in cutting contact and the teeth of the work being operated upon by the said cutter.

Figure 3:
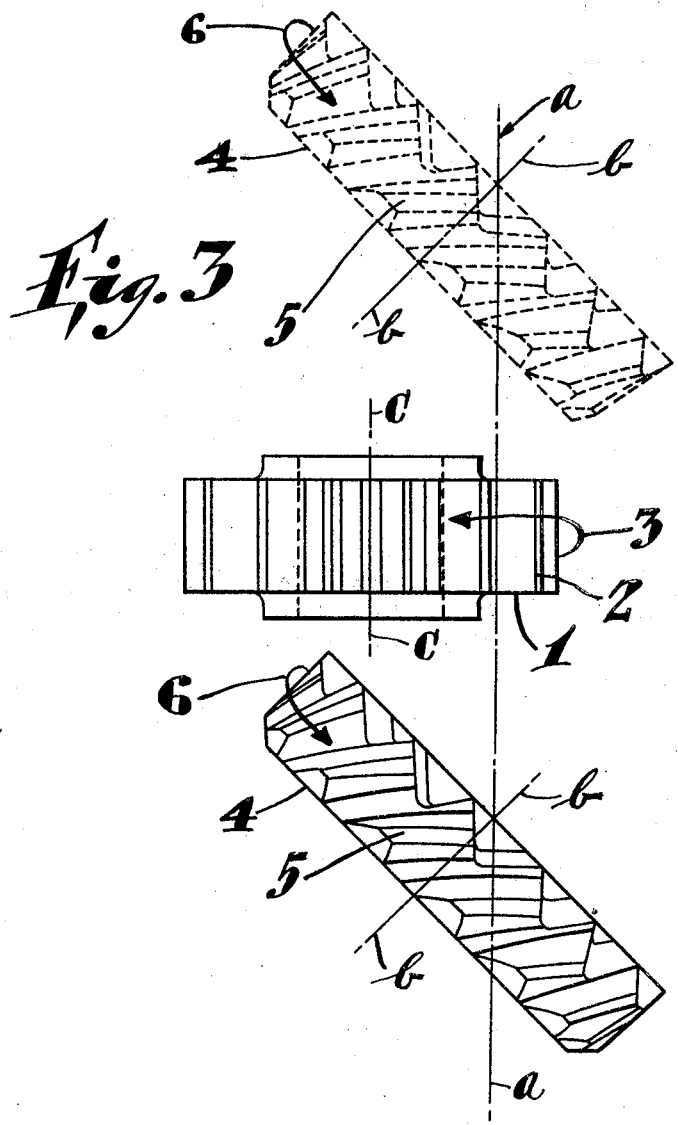
Fig. 3 is a view which corresponds to Fig. 2, except in this view the helical gear shaped cutter is shown in the position which it occupies when the cutting of the straight teeth in the gear is completed.

It is further to be observed that the aforesaid reciprocating movement of the cutter 4 along the line $a$—$a$, see Figs. 2 and 3, is along a line parallel to the straight teeth of the spur gear illustrated and which is also along a line parallel to the axis $c$—$c$ of said gear.

It is further obvious in the practice of the method referred to that the line $a$—$a$ is the path of reciprocating movement of the cutter and is to one side of the gear being cut when it is at the beginning of the operation of cutting the teeth 2 of the gear, and that it is at the other side of the gear being cut when it is at the end of the operation of cutting the teeth, see Figs. 2 and 3.

It will be understood that I could just as readily continuously rotate and move the gear 1 in mesh with this continuously moving imaginary curvilinear rack across and into and out of contact with the reciprocating cutter as I have moved the cutter in mesh with the rack into and out of contact with the gear as described. This is illustrated in the drawings, Fig. 4, the gear, cutter and characters being indicated by the same reference numerals but having the capital letter B affixed.

The present invention also provides a method of cutting helical gears of any desired helix angle with the same helical gear shaper cutter. This is possible for the reason that regardless of the angular position of the cutter axis, with respect to the axis of the gear blank, the cutter will generate a gear conjugate to its curvilinear rack, the teeth of which will mesh with any gear of the same or an identical cutter. This is illustrated in Fig. 5, the gear, cutter and characters being indicated by the same reference numerals but having the capital letter C affixed.

It is also obvious that I can by the method herein described, dispose the axes of the cutter and blank to such angular positions, one with the other, and produce the spiral twisted teeth of left hand helical gears, using a right hand cutter. This is illustrated in Fig. 6, the gear, cutter and characters being indicated by the same reference numerals but having the capital letter D affixed.

The straight teeth of the spur gear illustrated in Fig. 1 will result if the axes of the work spindle and cutter spindle are adjusted to and secured in angular positions, one with the other.

By the expression "secured in angular position", with reference to Fig. 1, I mean that the axis of the work may be adjustably positioned perpendicular to the plane of the surface of the sheet of drawing of Fig. 1, when the axis of the cutter is adjustably disposed at an angle thereto, and vice versa.

The same movements, however, as herein referred to will continue and points on the axis of one will approach points on the axis of the other until finally the minimum measure of distance between said axes is reached, the movements continuing as described will increase the measure of distance between said points on the axes. In this movement, the axes of the work spindle and the cutter spindle, will always be disposed at an angle to each other as illustrated in the drawings, and the reciprocation of the cutter will always be along a line perpendicular to the plane normal to the tooth helicoid, or, as illustrated in the drawings, along a line perpendicular to the plane of the sheet of drawings, Figs. 1, 4, 5, and 6.

The position of the cutter 4 as it begins to cut the teeth of the gear 1 is illustrated in Fig. 2. It will be observed that the position of the cutter 4 is shown, for the purpose of illustration only, to the left of the gear 1 and on its lowermost position of the stroke, the cutter is shown in full lines and at the top of its stroke it is shown in dotted lines.

In Fig. 3 the teeth 2 of the gear 1 are shown as having been completed by the cutter 4. Thus Fig. 2 corresponds substantially to the position of the gear 1 and cutter 4A of Fig. 1, and Fig. 3 corresponds substantially to the position of the gear 1 and cutter 4 of Fig. 1.

Figure 4:
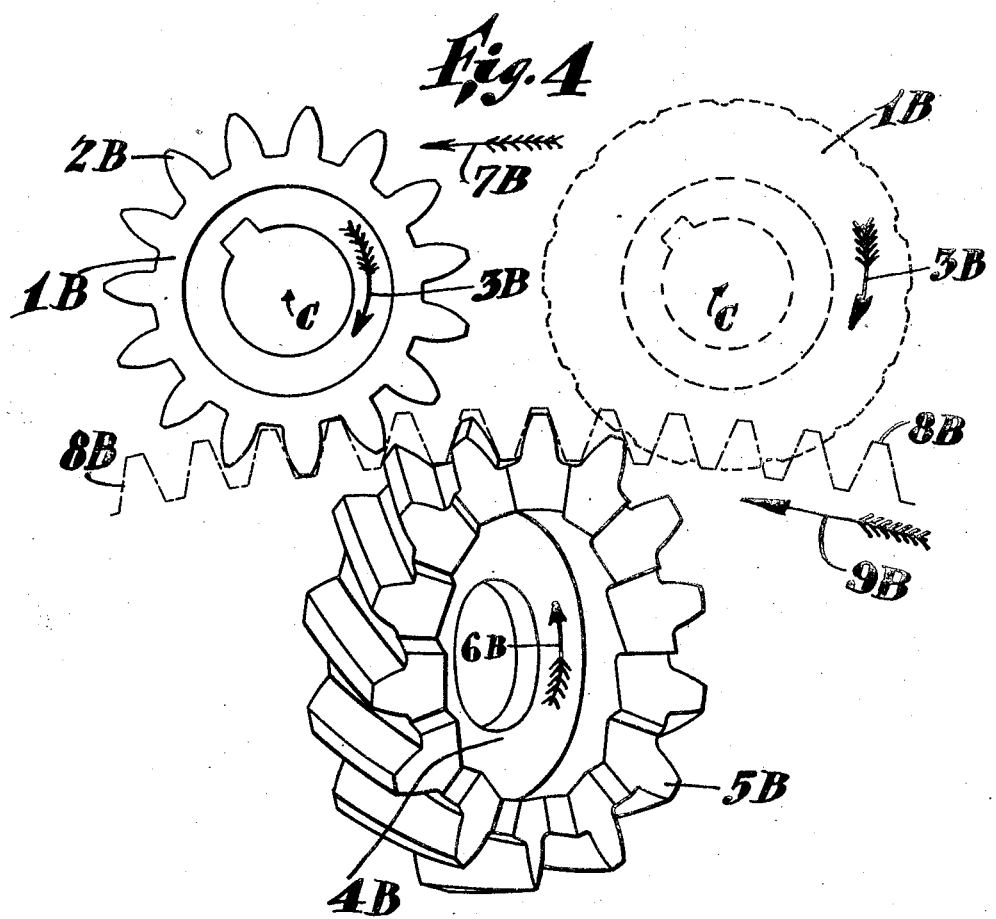
Fig. 4 is a view similar to Fig. 1, except in this view the order is reversed and the straight tooth gear is shown as having the two positions occupied by the cutter of Fig. 1; namely, before and after the teeth are cut.

It is to be noted, with respect to Fig. 1, that a right hand helical cutter is used to produce the straight teeth of the spur gear shown. This is also shown in Figs. 2, 3 and 4. A left hand cutter could be used equally as well, it being simply a matter of adjustment of the axes of the cutter and work together with correct correlation of the movements herein referred to.

It will be further observed in Fig. 1 that the axes of the work and cutter are disposed to each other at the angle of helix in the cutter.

With reference to Fig. 5 it will be observed that the same right hand helical cutter is being used to cut the teeth in the right hand helical gear, and further that the axes of the gear and cutter are disposed to each other at angles determined by the angle of helix of the gear plus the angle of helix of the cutter.

With reference to Fig. 6 it will be observed that in the case of a right hand helical cutter cutting the teeth of a left hand helical gear having the same helix angle as the helix angle of the teeth of the cutter, the axes of the work and cutter will be parallel to each other. From this, therefore, it follows that if a left hand helical gear of a given helix angle is cut by a right hand cutter of a different helix angle the axis of the work and cutter will be disposed at an angle to each other equal to the difference between the helix angle of the teeth of the cutter and the helix angle of the teeth to be generated in the gear blank. The reciprocating movement of the cutter, however, regardless of the adjustment of the axes of the cutter and work to meet conditions above referred to, will be along a line parallel to the twisted teeth of the cutter and this line will be, as previously stated in the example referred to, perpendicular to the sheets of drawings of Figs. 1, 4, 5 and 6, or along the lines $a-a$, Figs. 2 and 3.

It is obvious that the relative movements hereinbefore referred to, with reference to the cutter, work and curvilinear rack 8, of Fig. 1, would result in the same method if the order of curvature of the curvilinear rack was reversed from that shown in Fig. 1. This is illustrated in Fig. 7 in which the same reference numerals are used with the capital letter E affixed.

Gears cut in accordance with the present invention will roll on the curvilinear rack conjugate to the gear shaper cutter employed in cutting them and all gears cut by the helical cutter conjugate to the same curvilinear rack will mesh properly with each other.

It is to be understood that the expressions, "curvilinear rack", "curvilinear rack of infinite length" or "imaginary curvilinear rack", referred to herein, are used in a generic sense and may mean, for example, a gear having any number of teeth or a gear having specifically 135 or more teeth, in which gear the chordal tooth thickness is substantially equal to the tooth pitch line thickness.

What I claim is:

1. The herein described method of generating teeth in a gear blank with a gear shaper cutter having helical teeth which comprises positioning the cutter with its axis at an angle to the axis of the blank, rotating the cutter and blank in intermeshing relation, reciprocating the cutter across the face of the blank and simultaneously moving the cutter laterally into and out of engagement with the blank while maintaining intermeshing relation between the cutter and blank and an imaginary curvilinear rack conjugate to both the cutter and blank and moving between the same.

2. The herein described method of generating teeth in a gear blank with a gear shaper cutter having helical teeth which comprises positioning the cutter with its axis at an angle to the axis of the blank, moving the cutter laterally with respect to the blank along a common curvilinear line tangent to the pitch circles of the cutter and blank, rotating the cutter and blank at the rates of speed at which they would be driven by an imaginary curvilinear rack moving along said tangent line and reciprocating a cutter to generate the teeth of the gear blank.

3. The herein described method of generating teeth in a gear blank with a gear shaper cutter having helical teeth which comprises positioning the cutter with its axis at an angle to the axis of the blank, feeding the cutter tangentially with respect to the blank while rotating the cutter and blank at speeds such as to maintain both in intermeshing relation with respect to an imaginary curvilinear rack meshing with both the cutter and blank and reciprocating the cutter to generate the teeth of the gear blank.

4. The herein described method of generating teeth in a gear blank with a gear shaper cutter having helical teeth which comprises positioning the cutter with its axis at an angle to the axis of the blank rotating the cutter and blank at different peripheral speeds at their pitch circles, imparting a relative movement to the gear blank and cutter at the speed necessary to maintain both in intermeshing relationship with an imaginary continuously moving curvilinear rack conjugate to the cutter and gear blank and reciprocating the cutter to generate the teeth of the gear blank.

5. The herein described method of generating teeth in a gear blank in intermeshing relationship with an imaginary curvilinear rack and with a gear shaper cutter having helical teeth, which comprises positioning the cutter with its axis at an angle to the axis of the blank, corresponding to the helix angle of the cutter teeth, rotating the cutter and blank in intermeshing relation, reciprocating the cutter at an angle to its axis across the face of the blank in the direction of the axis of the blank, and feeding the cutter laterally with respect to the axis of the blank while maintaining intermeshing relationship between the cutter, the blank and the imaginary curvilinear rack.

6. A method of generating teeth in gear blanks comprising rotating a gear shaped cutter having helical teeth in intermeshing relation with a rotating gear blank, reciprocating the cutter transversely of the face of the gear blank, and simultaneously moving the cutter and gear blank closer together by a relative movement along a curvilinear line tangent to a pitch circle of the cutter and gear blank.

7. The method of generating helical teeth in gear blanks comprising rotating a gear shaped cutter having helical teeth in intermeshing relation with a rotating gear blank, the axes of the cutter and gear blank being disposed with respect to each other at an angle equal to the sum of the helix angle of the cutter and the helix angle of the teeth to be generated on the blank, relatively reciprocating the cutter and blank transversely of their faces, and moving the cutter and blank closer together by a relative movement along a curvilinear line tangent to a pitch circle of the cutter and a pitch circle of the gear blank.

8. The method of generating helical teeth in gear blanks which comprises rotating a gear shaped cutter having helical teeth of the same hand as the teeth to be generated in the blank in intermeshing relation with a rotating gear blank, the axis of the cutter being disposed at an angle to the axis of the blank corresponding to the sum of the helix angle of the teeth of the cutter and the helix angle of the teeth to be generated in the blank, reciprocating the cutter transversely of the face of the blank along a line perpendicular to the plane normal to the tooth helicoid, and simultaneously moving the cutter and gear blank closer together by relative movement along a curvilinear line tangent to a pitch circle of the cutter and a pitch circle of the gear blank.

9. The method of generating helical teeth in gear blanks which comprises rotating a gear shaped cutter having helical teeth in intermeshing relation with a rotating gear blank, the axes of the cutter and blank being arranged at an angle equal to the difference between the helix angle of the teeth of the cutter and the helix angle of the teeth to be generated on the blank, relatively reciprocating the cutter and blank transversely of their faces, and moving the cutter and gear blank closer together by a relative movement along a curvilinear line tangent to a pitch circle of the cutter and a pitch circle of the gear blank.

10. The method of generating helical teeth in gear blanks which comprises rotating a gear shaped cutter having helical teeth of the opposite hand to the helical teeth to be generated on the blank in intermeshing relation with a rotating gear blank, the axes of the cutter and gear blank being arranged parallel to each other, relatively reciprocating the cutter and blank transversely of their faces, and simultaneously moving the cutter and gear blank closer together by a relative movement along a curvilinear line tangent to a pitch circle of the cutter and gear blank.

11. The herein described method of generating helical teeth in a gear blank with a gear shaper cutter having helical teeth which comprises positioning the cutter with its axis at an angle to the axis of the blank corresponding to the sum of the helix angle of the teeth of the cutter and the helix angle of the teeth to be generated on the blank, relatively moving the cutter and blank laterally along a common curvilinear line tangent to the pitch circles of the cutter and blank, rotating the cutter and blank at the rates at which they would be driven by an imaginary curvilinear rack moving along said curvilinear tangent line, and relatively reciprocating the cutter and blank transversely of their faces to generate the teeth of the gear blank.

12. The herein described method of generating helical teeth in a gear blank with a gear shaper cutter having helical teeth which comprises positioning the cutter with its axis parallel to the axis of the blank, relatively moving the cutter and blank laterally along the common curvilinear line tangent to the pitch circles of the cutter and blank, rotating the cutter and blank at the rates at which they would be driven by an imaginary curvilinear rack moving along said curvilinear tangent line, and relatively reciprocating the cutter and blank transversely of their faces to generate the teeth of the gear blank.

13. The herein described method of generating helical teeth in a gear blank with a gear shaper cutter having helical teeth which comprises positioning the cutter with its axis at an angle to the axis of the blank corresponding to the sum of the helix angle of the teeth of the cutter and the helix angle of the teeth to be generated in the blank, rotating the cutter and blank at different peripheral speeds at their pitch circles, imparting a relative movement to the gear blank and cutter at the speeds necessary to maintain both in intermeshing relationship with an imaginary continuously moving curvilinear rack conjugate to the cutter and gear blank, and relatively reciprocating the cutter and blank transversely of their faces to generate the teeth of the gear blank.

14. The herein described method of generating helical teeth in a gear blank with a gear shaper cutter having helical teeth which comprises positioning the cutter with its axis parallel to the axis of the blank, rotating the cutter and blank at different peripheral speeds at their pitch circles, imparting a relative movement to the gear blank and cutter at the speed necessary to maintain both in intermeshing relationship with an imaginary continuously moving curvilinear rack conjugate to the cutter and gear blank and relatively reciprocating the cutter and blank transversely of their faces to generate the teeth of the gear blank.

15. The herein described method of generating straight teeth in a gear blank with a gear shaper cutter having helical teeth which comprises positioning the cutter with its axis at an angle to the axis of the blank corresponding to the helix angle of the teeth of the cutter, rotating the cutter and blank in intermeshing relationship, reciprocating the cutter across the face of the blank and simultaneously moving the cutter laterally into and out of engagement with the blank while maintaining intermeshing relation between the cutter and blank and an imaginary curvilinear rack conjugate to both the cutter and blank and moving between the same.

16. The herein described method of generating teeth in a gear blank with a gear shaper cutter having helical teeth which comprises effecting an intermeshing relationship between the blank and the cutter and an imaginary curvilinear rack conjugate to both, positioning the cutter with its axis at an angle to the axis of the blank corresponding to the helix angle of the cutter teeth, rotating the cutter and blank in intermeshing relationship, relatively reciprocating the cutter and blank across their faces in the direction of the axis of the blank, and feeding the cutter laterally with respect to the axis of the blank while maintaining intermeshing relationship between the cutter, the blank and the imaginary curvilinear rack.

17. The herein described method of generating straight teeth in a gear blank with a gear shaper cutter having helical teeth which comprises positioning the cutter with its axis at an angle to the axis of the blank corresponding to the helix angle of the teeth of the cutter, relatively moving the cutter and blank laterally along a common curvilinear line tangent to the pitch circles of the cutter and blank, rotating the cutter and blank at the rates of speed at which they would be driven by an imaginary curvilinear rack moving along said tangent line, and relatively reciprocating the cutter and blank transversely of the face of the latter to generate the teeth of the gear blank.

18. The herein described method of generating helical teeth of one hand in a gear blank with a gear shaper cutter having helical teeth of the opposite hand which comprises positioning the axes of the cutter and blank at an angle to each other corresponding to the difference between the helix angle of the cutter teeth and the helix angle of the teeth to be generated in the blank, relatively moving the cutter and blank laterally along a common curvilinear line tangent to the pitch circles of the cutter and blank, rotating the cutter and blank at the rates at which they would be driven by an imaginary curvilinear rack moving along said tangent line, and relatively reciprocating the cutter and blank transversely of their faces to generate the teeth of the gear blank.

In testimony whereof I affix my signature.

OLIVER G. SIMMONS.